Oct. 2, 1945.    H. S. CHURCH    2,386,034
MANUFACTURE OF SOLID RUBBER TIRES
Filed Aug. 3, 1942    3 Sheets-Sheet 1

Inventor
Herman S. Church
By Trease and Bishop
Attorneys

Inventor
Herman S. Church
By Frease and Bishop
Attorneys

Oct. 2, 1945.  H. S. CHURCH  2,386,034
MANUFACTURE OF SOLID RUBBER TIRES
Filed Aug. 3, 1942  3 Sheets-Sheet 3
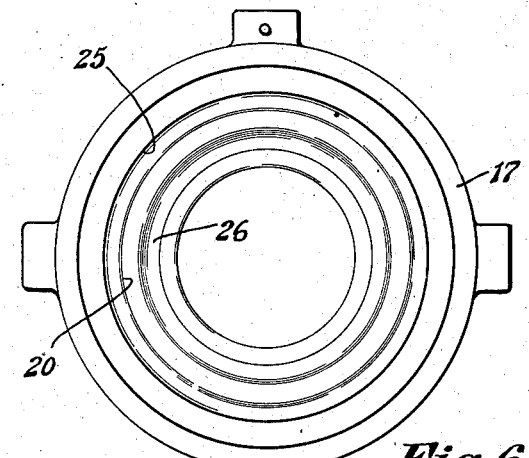
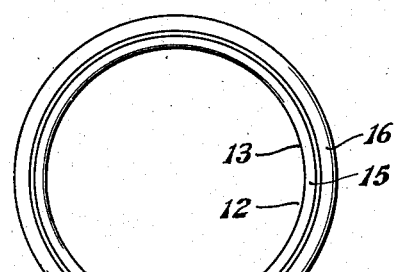
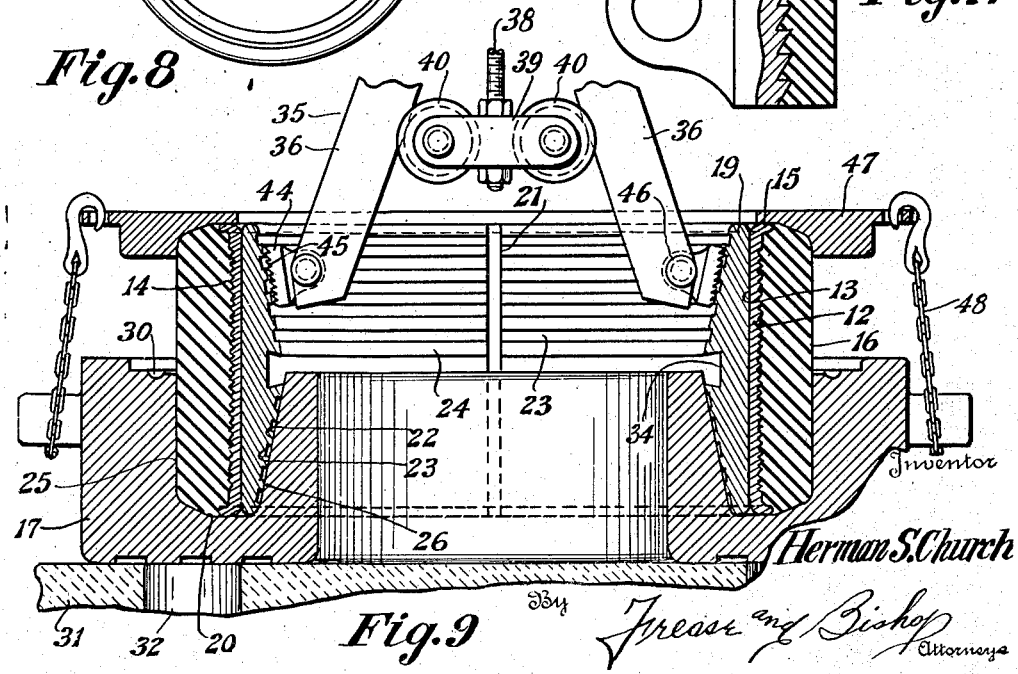

Patented Oct. 2, 1945

2,386,034

UNITED STATES PATENT OFFICE 2,386,034

MANUFACTURE OF SOLID RUBBER TIRES

Herman S. Church, Cuyahoga Falls, Ohio, assignor to The Monarch Rubber Company, Hartville, Ohio, a corporation of Ohio Application August 3, 1942, Serial No. 453,398

4 Claims. (Cl. 294—97)

The invention relates to solid rubber tires and more particularly to a tire having a solid rubber tread cured onto a steel band or base ring, and to the removal of such a tire from the mold in which it is cured or vulcanized.

Solid rubber tires having a solid rubber tread cured onto an inner steel band or base ring have been made for years. Such tires have a relatively narrow tread width and their manufacture does not present any difficult problems.

However, recently there has been a demand for tires of this character having a tread width greatly in excess of those heretofore made. For example the rubber treads may be as wide as six to twelve inches and may have a width of from two to three times their thickness. Tires of this character are very difficult to remove from the molds in which they are cured without damaging the rubber tread or steel base ring.

These difficulties arise because of the relatively large circumferential area of the tread and ring in contact with the mold; and because the tire must be held in the mold under substantial pressure or compression during vulcanization. Thus, a large amount of frictional resistance of rubber tread surface to mold surface and steel ring surface to mold surface under pressure must be overcome in order to remove the tires from the molds.

Moreover, it is desirable if not necessary to remove the tires from the molds as quickly as possible after the molds have been removed from the vulcanizing pits; but at the same time, the rubber stock used for such tires, while it is still warm and before it has once cooled from the vulcanizing operation, is quite brittle and may be easily torn or damaged. The rubber tread cannot be gripped for removal. Accordingly, the difficulties of removal are materially increased; and great care must be taken to prevent damage to the tread rubber and steel base ring when stripping the same from the mold.

Moreover, the shape of the tire increases the difficulties encountered. The outer surface of the tread rubber is substantially cylindrical. The inner surface of the base ring is substantially cylindrical. The component parts of the tire are maintained under pressure while carrying out the vulcanizing operation. The base ring must be supported against distortion due to such pressure which might cause it to be bent out of round. Also the base ring must be maintained concentric with the mold and tread while the pressure is maintained.

These considerations make it desirable if not necessary to internally back up the cylindrical base ring against distortion and for centering; and to obtain and maintain the desired pressure by slightly over-filling the rubber cavity of the mold with rubber so that when the mold halves are pressed together, the rubber for the tread is under extreme pressure within the mold cavity against the base ring therein. By these means the proper adhesion between the tread rubber and steel base ring is obtained when the rubber is vulcanized.

Thus, the inner surface of the steel base ring is covered by the backing means; the outer tread rubber cannot be gripped; and the annulus is under radial compression throughout its circumference between the substantially cylindrical surfaces of the mold cavity and backing means. The backing means found most satisfactory is a split inner ring having a cylindrical outer surface engaging the inner surface of the base ring and having a slightly double tapered or wedged annular inner surface for engagement with complementary surfaces of the mold halves. This split inner ring in turn is in tight wedged frictional engagement with the mold halves and with the base ring.

Because of this arrangement it is impossible to grip the inner split backing ring in any way so as to contract it to relieve the pressure.

I have discovered, however, that if, after separating the two mold halves, leaving the tire and inner ring in one of the mold halves, the inner ring is engaged internally by internal expanding tong means to securely grip the inner ring and very slightly expand or distort the same, the inner ring can be pulled axially from the mold and from within the base ring. Such procedure is exactly contrary to that which one would normally believe to be the proper procedure, because the tendency would appear to be of increasing the frictional resistance between the outer surface of the inner ring and the inner surface of the base ring.

Whatever may be the mechanics of the operation, the resultant effect is that the internally expanding tong means and the inner ring gripped thereby may then be slowly raised to separate the inner ring from the tire. The tong means may then be again used in the same way to grip the inner cylindrical surface of the tire base ring to remove the tire axially from the mold. In carrying out such operations, the parts seem to separate easily without damaging any of the component parts of the tire.

Accordingly, it is an object of the present invention to provide a means for stripping a steel ring-backed solid rubber tire from a vulcanizing mold.

It is a further object of the invention to provide a means for separating a split inner back-up ring from a steel ring-backed solid rubber tire and from a mold containing the back-up ring and tire.

Also it is an object of the invention to provide a means for stripping a steel ring-backed solid rubber tire from a vulcanizing mold quickly and without damaging the component parts of the tire.

It is also an object of the present invention to provide a means for separating cylindrical and annular wedged rubber and metal surfaces without engaging the rubber surface and without damaging any part engaged.

Moreover, it is an object of the present invention to provide a means for stripping a steel ring backed-up solid rubber annulus having substantially cylindrical inner and outer surfaces from a mold in which it is held under compression.

Finally, it is an object of the present invention to overcome the difficulties and to achieve the results discussed above.

The above and other objects may be obtained by the apparatus, parts, combinations and arrangements of the present invention, preferred embodiments of which are hereinafter described in detail and are shown somewhat diagrammatically in the accompanying drawings, and which are set forth in the appended claims.

In the drawings:

Fig. 6 is a plan view on a smaller scale of the lower mold half shown in Figs. 1 to 4;

Fig. 7 is a plan view on a smaller scale of the inner split ring mold ring shown in Figs. 1 and 2;

Fig. 8 is a plan view on a smaller scale of the completed tire shown in Fig. 5;

Fig. 9 is a view similar to Fig. 2, showing a modified step of stripping;

Fig. 10 is an enlarged view of one of the tong gripping jaws; and

Fig. 11 is a view similar to Fig. 10 of a modified form of tong gripping jaw.

Similar numerals refer to similar parts throughout the various figures of the drawings.

In the following detailed description of the invention, the manufacture of a steel ring-backed solid rubber tire is described. It is to be understood, however, that the invention is not limited to a tire backed particularly with a steel ring, as the reinforcing ring may be formed of some other metal than steel. Moreover, it is to be understood that the invention is not limited to the manufacture of a tire having the exact proportions shown in the accompanying drawings, because the diameter, or thickness, or width of the tire may be varied.

In the manufacture of metal ring-backed solid rubber tires, a ring is used, preferably formed of steel, having the desired characteristics, such as the back-up ring indicated generally at 12, and having an internal preferably cylindrical surface 13, an outer generally cylindrical ribbed surface 14, and end flanges 15. The rings 12 are usually sand blasted, at least on the corrugated or ribbed surface 14 thereof. An adhesion cement is then applied to the corrugated or ribbed outer ring surface 14. Uncured, preferably extruded tread rubber of the desired composition or compound is then applied to the adhesion cement coated outer ring surface 14 in any suitable manner, preferably on a modified type of tire building machine, to form the tread generally indicated at 16.

Figure 1:
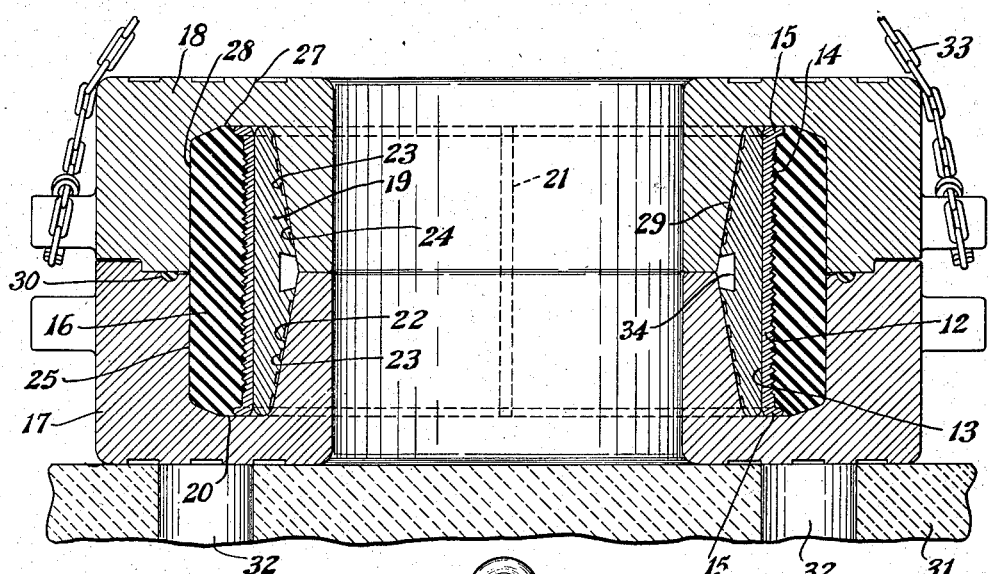
Figure 1 illustrates in vertical section, a mold containing a metal ring backed-up solid rubber tire just after it has been removed from the vulcanizing pit or chamber.

A ring 12 with uncured tread rubber thereon is then taken to a mold, such as the mold indicated in Fig. 1. The mold at this time is in separated condition, and the mold cavity has been cleaned and preferably sprayed with a soap solution which acts as a lubricant. The mold may comprise a lower mold half or section generally indicated at 17, an upper mold half generally indicated at 18, and an inner split ring generally indicated at 19. The amount of uncured tread rubber on the ring 12 is just a little more than sufficient to fill the mold cavity when the mold is assembled.

The ring 12 with uncured tread rubber thereon is then inserted axially within the mold cavity 20 of the lower mold half 17, and the split inner ring 19 is then inserted axially within the tire ring 12 and within the mold cavity 20. The split inner mold ring 19, because of being split at 21, may be readily inserted within the inner cylindrical surface 13 of tire ring 12, and the ring 19 is preferably provided with a lower conical wedge or tapered surface 22, which may be annularly relieved as at 23, and with an upper conically tapered or wedge surface 24 similarly relieved at 23.

The mold cavity 20 of the lower mold half 17 is provided with an outer substantially cylindrical surface 25, except for some slight amount of draft, and with an inner conical tapered or wedged surface 26 complementary to the inner ring surface 22.

As the ring 19 is inserted within the tire and into the lower mold cavity 20, it will not quite seat at the bottom of the mold cavity, due to the engagement of the complementary surfaces 22 and 26. Likewise, the uncured tire does not quite seat in the lower mold cavity, due to the slight amount of excess rubber in the tread, which may originally project slightly downward below the lower flange 15 of the backing ring 12.

The upper mold half 18 is then telescoped over the uncured tire generally to the position shown in Fig. 1, although at this time it does not rest on the lower mold half 17. The upper mold half or section 18 has a mold cavity 27, similar to the mold cavity 20 of the lower mold half; and the mold cavity 27 has a substantially cylindrical outer cavity surface 28 and an inner conically tapered or wedged surface 29 complementary to the surface 24 of the inner ring 19.

The mold sections 17 and 18 are then subjected to pressure, preferably in a press engaging the lower surface of mold section 17 and the upper surface of mold section 18 to seat the mold sections 17 and 18 together in the position shown in Fig. 1, and to seat the inner ring 19 in the position shown. When the mold sections are seated, as described, the inner ring 19 accurately centers the tire ring 12 within the mold cavity, due to the wedging action of surfaces 22 and 26, and 24 and 29. This wedging action also expands the split ring 19 to tightly engage the inner cylindrical surface 13 of the tire ring 12 and to support the ring against distortion due to the pressure on or compression of the tread rubber.

Moreover, at this time the uncured tread rubber completely fills the remainder of the mold cavity and is placed under compression or pressure against the walls of the mold cavity and the tire ring 12. The slight excess amount of rubber of course flows outward into overflow groove 30.

A number of similar molds are then placed in the usual type of open steam vulcanizing chamber such as a vulcanizing pit, stacked one upon another, or individual molds may be placed in platen type vulcanizing presses, and the mold halves are held seated preferably under hydraulic pressure, while the vulcanizing operation is being carried out.

After the vulcanizing operation has been completed, the molds are taken to a table, such as indicated generally at 31, preferably provided with one or more electromagnets 32 for holding the lower mold section 17 to the table 31. The upper mold half 18 is then engaged by a lifting sling or chain 33 of an electric, air or hydraulic hoist or crane, and the mold half 18 is raised to separate it from the lower mold half 17. Ordinarily, the upper mold half 18 will come off alone, leaving the tire and inner ring 19 in the lower mold half in the position shown in Fig. 2. This is accomplished by placing more soap solution in the upper mold section 18 when it is cleaned and prepared. However, in case the tire and inner ring 19 hold to the upper mold half 18 and strip from the lower mold half, the lower mold half is removed and the upper mold half is turned over to the position of the lower mold half 17 shown in Fig. 2.

Thus far, the stripping operation does not involve any difficulties, and is easy to carry out as described, because it is possible to separately engage and hold each mold half to apply force to axially separate the same.

Figure 2:
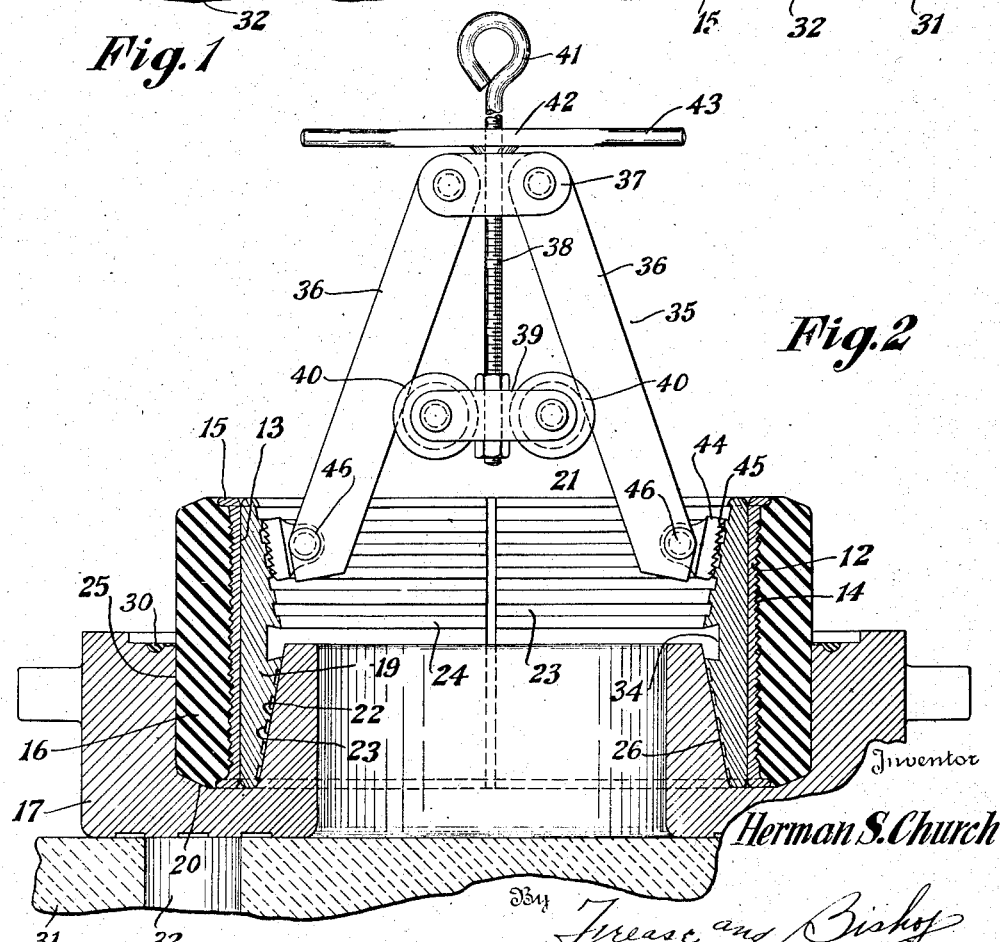
Fig. 2 is a view similar to Fig. 1, showing the mold after the upper mold half has been removed, and showing the improved internal expanding tong means gripping the inner mold ring.

However, a serious problem is presented at the stage of the stripping operation shown in Fig. 2. At this time the vulcanized tread rubber 16 is still located under its own compression or pressure within the mold cavity of the upper or lower mold half, as the case may be, with the attendant frictional resistance between the outer substantially cylindrical surface of the tread 16 and the inner substantially cylindrical mold cavity surface 25. Also, the inner ring 19 is still tightly wedge engaged within the mold cavity and against the inner cylindrical surface 13 of the tire ring 12. There is a tremendous amount of frictional resistance present between the engaged cylindrical and wedge surfaces of the inner ring 19, the tire ring 12 and the mold cavity 29, due to the wedge action and also due to differences in expansion and contraction, incident to heating for vulcanizing, of the tire ring 12, the inner ring 19 and mold half 17, which are formed of different metals having different characteristics or analyses.

Moreover, the tread rubber 16 cannot be gripped for pulling the tire from the mold because it is still warm from the vulcanizing operation, and until it has cooled it is brittle or easily torn or damaged. The tire ring 12 is entirely covered, either by the tread 16 or the inner ring 19, except for the upper end flange 15; and the ring 12 cannot be gripped or engaged in any way for removing the tire until after inner ring 19 is removed.

The inner split ring 19 cannot be engaged at its under edge because the lower half of the ring is still in mold 17; and the ring 19 cannot be contracted because the wedge engagement of surfaces 22 and 26 prevents such contraction.

Although the inner split ring 19 is centrally relieved at 34 in order to separate the conical surfaces 22 and 24, the application of an upward pull to the ring 19 by engaging a tool in groove 34, does not satisfactorily operate to separate the ring 19 from the tire. This is apparently due to a number of reasons, although the exact explanation is not fully understood. First of all, a direct upward pull applied to the ring 19 by engaging in groove 34, does not seem to substantially relieve the frictional resistance and the entire amount of frictional resistance must be overcome by the pull. Second, it is difficult if not impossible, to exert an even pull in this manner throughout the inner periphery of the ring 19, and if the pull is not even, the ring 19 will be cocked and bind or wedge even tighter with the mold 17 and the tire ring 12. Third, there is not adequate room for engaging a suitable tool in groove 34. Moreover, any tool which might be satisfactorily used to engage in groove 34 for stripping the ring 19 from the tire, could not be used for later stripping the tire from the mold.

Heretofore, the only way in which the parts could be separated was to invert the parts of Fig. 2, and pound on the mold and tap the tire and ring lightly with a rubber mallet until the tire and ring 19 became dislodged from the mold. This procedure has resulted in damaging many tires, either by the hammering or tapping, with accidental tearing of the tread rubber 16 or distortion of the ring 12, or by the tire dropping on the floor from the mold when it is suddenly dislodged.

According to the present invention, these difficulties have been readily overcome by using the stripping method and internally expanding tong means well shown in Fig. 2.

The tong means are generally indicated at 35 and preferably comprise tong levers 36 pivotally connected at their upper ends with cross link members 37, through which a vertical threaded shaft 38 extends. A cross head 39 is adjustably connected to the lower end of shaft 38 and flanged rollers 40 are pivotally mounted on the cross head 39 and arranged so as to engage the inner or under edge of levers 36.

The upper end of shaft 38 may be provided with a hook or eye 41 for being connected to an electric, air or hydraulic hoist or crane, for raising and lowering the tong means 35. A threaded nut or wheel 42, provided with one or more turning handles 43, is preferably provided on the threaded shaft 38 so as to react against the upper face of link members 37.

A gripping jaw or head 44 provided with a toothed or serrated outer face 45, is pivotally mounted at 46 at the lower end of each tong lever 36 on an axis parallel with the pivot between the levers 36 and head 37.

The tong means 35 is lowered by the hoist approximately to the position shown in Fig. 2, whereupon the tong means is collapsed to permit the jaws 44 to move toward each other sufficiently that they may be inserted within ring 19. The handles 43 are turned to rotate nut 42 and raise rod 38, which, through the medium of cross head 39 and rollers 40, push levers 36 outwardly so that the outer faces of jaws 44 engage and grip the inner conical surface 24 of inner split ring 19. The hand wheel 43 is preferably used only to obtain the initial grip on the ring 19. Thereafter, the hoist is lifted to lift the expanding tong device, which securely grips the inner ring 19 and pulls it out of the mold cavity and from within the tire. The application of the pull from the hoist through shaft 38, cross head 39 and rollers 40 to levers 36, distributes the pulling force evenly to both gripping jaws 44 so that the pull on the ring 19 is an even, uniform pull with the resultant pull axial of the ring.

The stripping of the ring 19 from the tire and mold in this manner seems to relieve the frictional resistance between the engaged cylindrical and conical surfaces, and although the mechanics of the forces operating between the various component parts, which renders the stripping a relatively easy operation in accordance with the present invention, may not be entirely clear, it may possibly be due to the very slight expanding action of the tong device against the upper inner face of the split ring, which may tend to slightly pivot the lower inner circumferential edge of the split ring 19 on the mold cavity and release the frictional engagement, both, between cylindrical surfaces 13 and the outer surface of the ring 19, and between conical surfaces 22 and 26.

Figure 3:
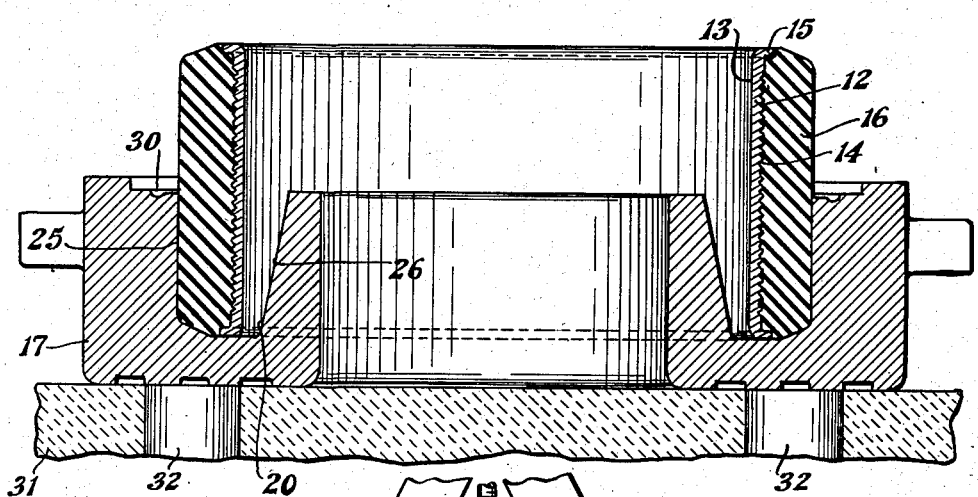
Fig. 3 is a view similar to Fig. 2, showing the inner mold ring removed.
Figure 4:
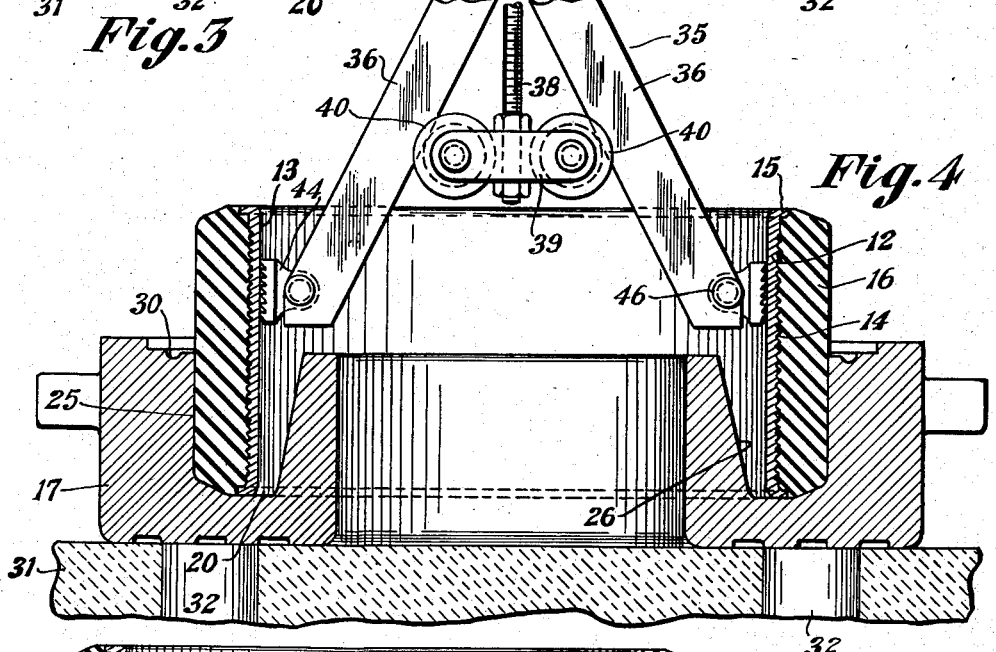
Fig. 4 is a view similar to Fig. 3, showing the improved tong means gripping the tire for removing the same from the lower mold half.
Figure 5:
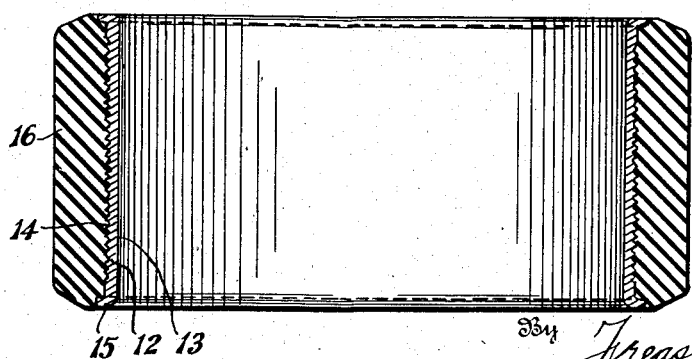
Fig. 5 is a elevation section of the completed tire after it has been removed from the mold.

Even though this explanation may not be the proper explanation, nevertheless, the fact remains that in this manner the ring 19 may be stripped very easily from the mold and tire so as to leave the tire in the mold as shown in Fig. 3. The split ring 19 is then lowered to a work table and released and the tong means 35 is again lowered and its jaws 44 engaged within the tire ring 12 to grip the same, as shown in Fig. 4. The tong means is again raised by the hoist, pulling the tire from the mold without damage thereto, after which the tire may be sent to the finishing room for any necessary finishing operations to produce the finished tire shown in Fig. 5.

It sometimes may happen that when the tong means 35 is engaged within the inner ring 19 and hoisted, the ring 19 and tire together may start to pull from the mold. In this event, a hold down ring 47 is placed over the tire as shown in Fig. 9, which engages the upper flange 15 of tire rim 12, and the hold down ring is connected by chains 48 or other means to the bottom mold section 17, which in turn is held by electromagnets 32. The tong means is then raised to withdraw the inner ring 19, the tire being held in the position shown in Fig. 9 by the hold down ring 47.

A modified form of gripping jaw is shown in Fig. 11, wherein the rubber face 45a may be provided as the gripping face for the pivoted gripping jaws 44.

In the use of the tong means 35, the jaws 44 grip either the inner annular surface of the split ring 19, or the inner annular surface of the tire ring 12, at a plurality of areas by expanding pressure; and due to the construction of the tong means and the axial pull of the hoist, this pressure is equalized and is applied to the areas gripped, normal thereto. Particularly when the split ring 19 is gripped, the areas engaged by the jaws 44 are offset from the median plane of the split ring perpendicular to its axis. Moreover, the jaws are always engaged with areas of the split ring spaced from the split, and when the tong means includes two levers, as shown, the areas engaged are opposite each other. As the tong means is lifted by the hoist, the expanding pressure exerted by the jaws initially by turning up hand wheel 42, is maintained and increased by the axial pull of the hoist on shaft 38.

Whether the outward expanding gripping pressure of the jaws results from the operation of the hand wheel or from the hoist pull, the resultant effect is to cause the cross head 39 to pivot the levers 36 about their head pivots and to force the jaws or push heads 44 substantially radially outward under equalized pressure.

Accordingly, the present invention provides a very simple device for overcoming the prior art difficulties of stripping a metal ring-backed solid rubber tire from a mold quickly after vulcanizing and without damaging the tire, and accomplishes the objects, overcomes the difficulties, and obtains the results hereinbefore set forth.

Having now described the features of the invention, the difficulties overcome, and an embodiment of means which may be used in accordance with the present invention; the new and useful methods, steps, procedures, apparatus, parts, combinations and arrangements constituting the present invention, and reasonable mechanical equivalents thereof, are set forth in the appended claims.

I claim:

1. A tong gripping device including a head, levers pivotally connected to the head, outwardly facing jaw means pivotally mounted on the levers on axes parallel to the head-lever pivot, a central cross head movably engaging the levers, and means engaging the head and connected to the cross head for moving the cross head relative to the head to pivot the levers about their head pivots and move the jaw means outward under equalized pressure.

2. A tong gripping device including a head, levers pivotally connected at one end to the head, outwardly facing jaw means pivotally mounted at the other ends of the levers on axes parallel to the head-lever pivot, a central cross head movably engaging the levers between the head and jaw pivots, and means engaging the head and connected to the cross head for moving the cross head relative to the head to pivot the levers about their head pivots and move the jaw means outward under equalized pressure.

3. A tong gripping device including a head, levers pivotally connected to the head, outwardly facing jaw means pivotally mounted on the levers on axes parallel to the head-lever pivot, a central cross head movably engaging the levers, a threaded shaft connected to the cross head and extending through the head, and a wheel threaded on the shaft and reacting against the head to move the cross head toward the head for pivoting the levers about their head pivots and moving the jaw means outward under equalized pressure.

4. A tong gripping device including a head, levers pivotally connected to the head, outwardly facing jaw means pivotally mounted on the levers on axes parallel to the head-lever pivot, a central cross head movably engaging the levers, a threaded shaft connected to the cross head and slidable through the head, a wheel threaded on the shaft and reacting against the head to initially move the cross head toward the head for pivoting the levers about their head pivots and move the jaw means outward under equalized pressure, and means for exerting an axial pull upon the shaft to further urge the cross head toward the head and continue to urge the jaw means outward under equalized pressure.

HERMAN S. CHURCH.